Aug. 14, 1962          H. A. ZOLLINGER          3,049,656
            D.C. SERIES BRAKE CONTROL FOR A.C. MOTOR DRIVES
Filed Nov. 17, 1960                              2 Sheets-Sheet 1

WITNESSES

INVENTOR
Howard A. Zollinger
BY
ATTORNEY

United States Patent Office 3,049,656
Patented Aug. 14, 1962

3,049,656
D.C. SERIES BRAKE CONTROL FOR A.C. MOTOR DRIVES
Howard A. Zollinger, Monroeville, Pa., assignor to Westinghouse Electric Corporation, East Pittsburgh, Pa., a corporation of Pennsylvania
Filed Nov. 17, 1960, Ser. No. 70,009
7 Claims. (Cl. 318—367)

This invention relates to an electric system of control and more particularly to a system of control for controlling the brake used with a load coupled to an electric motor to be driven thereby.

A broad object of this invention is the provision of a simpler, faster, and less expensive brake control.

Another broad object of this invention is to provide novel functions previously not obtainable with equipment having fewer components requiring lesser weight and lesser space than controls for similar purposes heretofore used in the art.

The objects recited are merely illustrative. Other objects and advantages will become more apparent from a study of the following specification when made with reference to the drawings, in which.

Some general discussion of the problem involved and certain attempted solution of the problem in the prior art may be helpful in fully appreciating the contribution to the art made by this invention.

One of the most highly regarded safety features of constant voltage direct-current hoist controls is the series brake used in these controls. The functional features this type of brake provides are usually asked for by the customer and when it does not appear in a drive many questions and doubts are raised. The main safety features of the series brake are: (1) The brake will not release until the motor is provided with electric power; (2) the brake will set if power fails; (3) the brake will set if the motor current is interrupted for any reason; and (4) when used with a power limit switch the brake will set directly because of the limit switch action and not because of the limit switch tripping a relay which in turn is to set the brake.

Along with the hereinabove mentioned safety features, the series brake has a very low inductive coil and thus very quickly releases and sets. This lower inductance of the series brake over a shunt brake helps speed up the operation. However, there is also automatic overshooting (high current for releasing and lower current for holding) because the motor normally starts at from 100% to 200% of normal load current, whereas a series brake will pick up on 40% normal load current and hold in on a much lower current. This means that there is an automatic forcing that can easily range from 2.5 to 1 to 5 to 1. This fact is why the release time of a series brake is never the complaint of hoist operator where it is quite often the complaint of the hoist operator when shunt brakes are used. With these requirements and highly desirable features a need has been present in alternating-current hoists to use direct-current brakes.

The invention herein disclosed shows circuitry for use with alternating-current hoists of all kinds but has particular utility with the hoist control known in industry by the Westinghouse trade name Load-O-Matic. Not only does the circuitry herein disclosed provide all the desirable features of the series brake, but does so with a reduced number of components, with reduced costs, with reduced space and with reduced weight.

Figure 3:
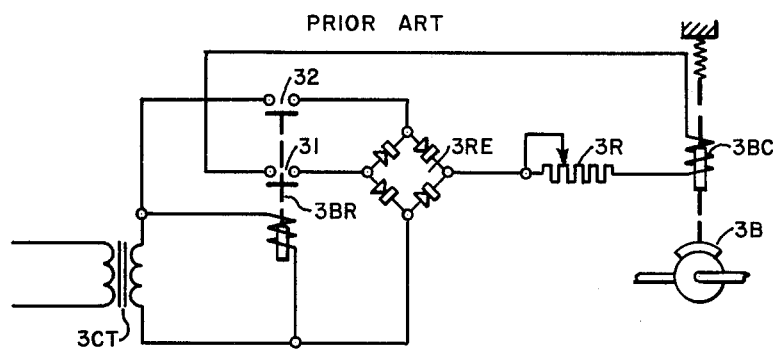
FIGS. 3 and 4 show some prior art circuitry of aid in disclosing this invention.
Figure 4:
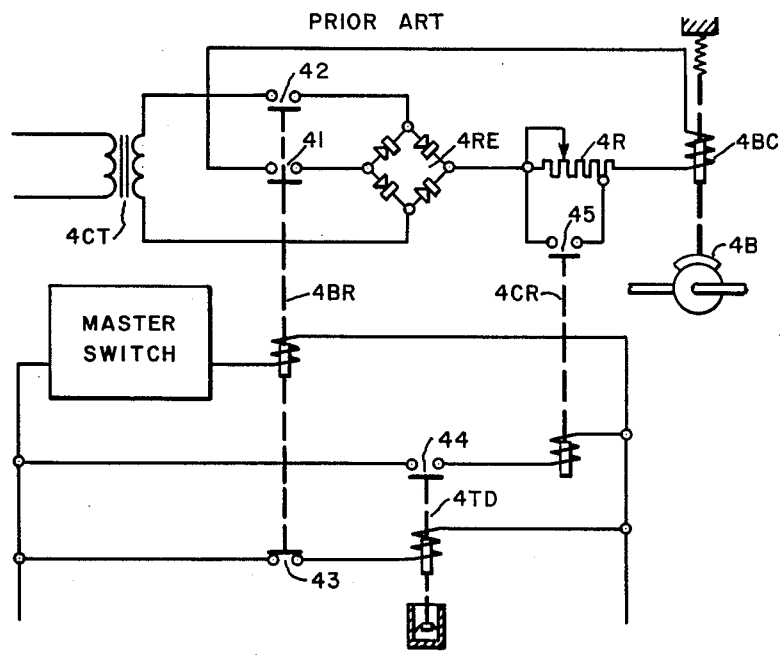

A brief mention of previous circuitry may be helpful. Such previous circuitry is shown in FIGS. 3 and 4. The 440/220 supply voltage comes from ahead of the motor or ahead of the trolley collectors depending on whether certain of the control equipment is mounted on the trolley or on the bridge respectively. That is, the primary of the control transformer CT is connected on the motor side of the switches connecting the motor to the supply. This means, for FIG. 3, that the moment the motor is connected to the supply the brake contactor 3BR is energized closing the contacts 31 and 32 to connect the full wave rectifier 3RE through the adjustable resistor 3R to the brake coil 3BC.

For FIG. 4, this means when the master switch is operated on the transformer, 4CT is energized, the brake relay 4BR is energized to close contacts 41 and 42 and open contacts 43. Since contacts 43 were closed the time relay 4TD was picked up and its contacts 44 were closed and control relay 4CR was picked up and contacts 45 closed.

The moment contacts 41 and 42 close rectifier 4RE through contacts 45 quickly effects energization of the brake coil 4BC. After a time contacts 44 open and effect dropout of 4CR to open contacts 45.

The showing in FIGS. 3 and 4 require a transformer, a rectifier, a resistor and a brake relay and FIG. 4 in addition requires a time delay relay and a control relay, or contactor.

Figure 1:
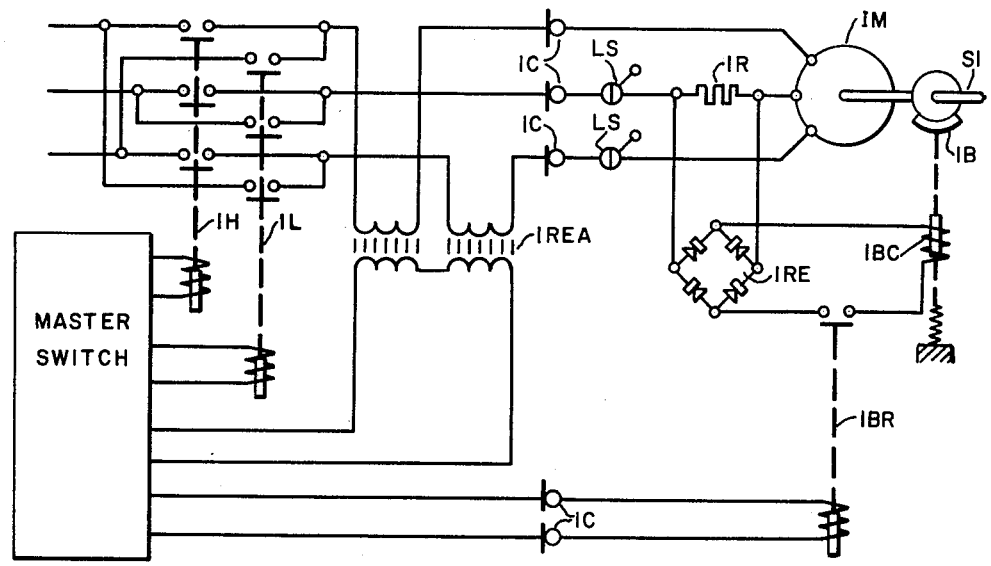
FIGURE 1 is a diagrammatic showing of one embodiment of this invention.
Figure 2:
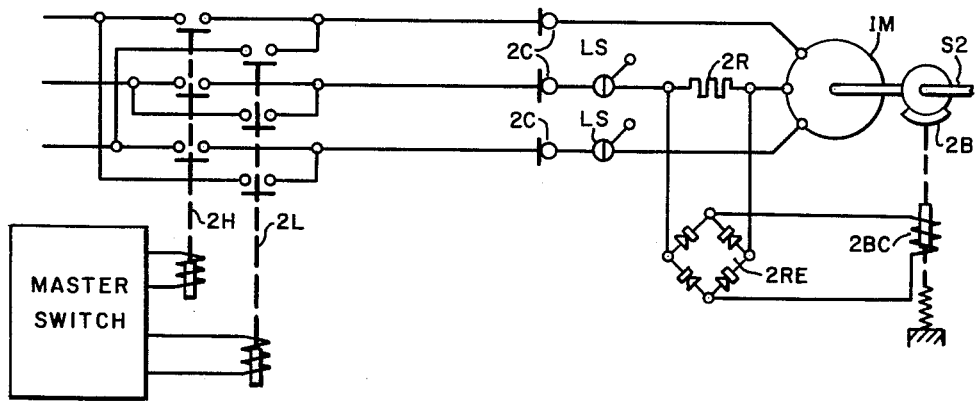
FIGURE 2 is a diagrammatic showing of a modification of this invention.

Mere inspection of FIGS. 1 and 2 will show how much simpler the circuitry of this invention is. Further, a series brake circuitry is used.

In the circuit shown in FIG. 1, IM represents an induction motor of the three-phase type, which through shaft S1 operates its load which may be hoist equipment.

This invention is not limited to a three-phase motor but is applicable to any alternating-current motor driving a load where the use of a brake is a necessity.

Each of two of the input leads of the motor have an adjustable reactor 1REA connected in series therewith and the third input lead has an impedance, preferably a resistor, 1R, connected in series. The master switch controls the hoist contactor 1H and the lowering contactor 1L and controls the reactance value of the reactors to thus vary the motor speed. Trolley collectors, and limit switches are indicated respectively at 1C and LS.

In FIG. 1, the brake 1B is shown having its brake releasing coil 1BC, through the contacts of the brake relay, or contactor, 1BR connected to the direct-current output terminals of the full-wave rectifier 1RE. The input terminals of the rectifier are connected across the resistor 1R. The resistor 1R is selected to provide such a voltage drop to force the majority, say two-thirds, of the current in the input lead including the resistor to flow through the brake release coil 1BC. For the type of motor control shown in FIG. 1, including reactors in each of the other two motor input leads, the voltage drop across the resistor 1R is beneficial because at full load torque the motor current causes a 6%, more or less, voltage drop across each of the reactor windings in series with each of the other two input leads. With a small voltage drop across the resistor 1R, the motor currents are more balanced and the small negative sequence current is further reduced. This resistor 1R also assures that the voltage at the rectifiers under acceleration or other transients will be very low, less than 50 volts peak inverse voltage. With the known fact that for the same kw. a high-current low-voltage rectifier is less expensive than a high-voltage low-current rectifier. This is a considerable cost reduction in the rectifier alone. The brake coil is preferably selected to pick up on 40% of rated current and hold in, that is maintain the brake released, at 10% of rated current. For another standard, brake coil picks up on 80% of rated current and holds in on 20% rated current.

For the type of control shown in FIG. 1, this is ideal because the let-through current is 8% to 10% current at zero speed and no load and up to 40% current at no load and full speed. This eliminates any problem of the brake setting at light loads. At the current in the input line including the resistor, 1R is higher than in the other two input lines and inherently forces the brake for a faster release than can be obtained with a shunt brake.

When the master switch is put in the Off position, the arrangement is such that the brake relay, or contactor, 1BR is deenergized. This means the brake always sets when the master switch sets the drive in the Off position.

On drives, as shown in FIG. 2, which do not use reactors for speed control in certain of the input leads the brake relay, or contactor, can be omitted. It will be noted that the input of the rectifier 2RE is connected across resistor 2R and that the rectifier output terminals are connected directly to the brake release coil 2BC. The brake 2B is thus released the moment either 2L or 2H supply power to the motor.

While only two embodiments are herein disclosed, the invention is not limited to such two embodiments but that other modifications may be devised falling within the spirit and scope of this invention.

I claim as my invention:

1. In an electric system of control for controlling the brake used with equipment operated by a multiphase alternating-current motor, in combination, a multiphase alternating-current motor, input leads for each of the phases of the motor, switching means for connecting the input leads to a suitable multiphase alternating current supply, an impedance connected in series with one of the input leads, rectifying means interconnected with said impedance for rectifying, by reason of the voltage drop across said impedance upon connection of the motor to the supply, a portion of the current flowing in the input lead provided with the impedance, an electromagnetic brake for the equipment, said brake having a coil for releasing the brake, and circuit means connecting the coil to the output of said rectifying means.

2. In an electric system of control for controlling the brake used with equipment operated by an electric motor, in combination, a three-phase alternating-current motor coupled to the equipment to be driven by the motor, three input leads for the motor, a resistor connected in series with one of the input leads, switching means for connecting said motor and resistor to a suitable source of three-phase alternating-current supply, rectifying means connected across said resistor to thus have a direct-current output as a function of the current flow in the input lead provided with the resistor, an electromagnetic brake for the equipment, said brake having a coil for releasing the brake connected to the output of said rectifying means.

3. In an electric system of control for controlling the brake used with equipment operated by an electric motor, in combination, a three-phase alternating-current motor coupled to the equipment to be driven by the motor, three input leads for the motor, a resistor connected in series with one of the input leads, switching means for connecting said motor and resistor to a suitable source of three-phase alternating-current supply, rectifying means having input terminals connected across said resistor and having output terminals for supplying a direct-current output that is a function of the voltage drop across said resistor, an electromagnetic brake for the equipment, said brake having a coil for releasing the brake, and circuit means, including switching means, for connecting the coil to the output terminals of said rectifying means.

4. In an electric system of control for controlling the brake used with equipment operated by an electric motor, in combination, a three-phase alternating-current motor coupled to the equipment to be driven by the motor, three input leads for the motor, a resistor in one input lead and controllable reactors in each of the other two leads, switching means for connecting said motor through the resistor and controllable reactors to a suitable source of three-phase alternating-current supply, rectifying means connected across said resistor to thus have a direct-current output as a function of the current flow in the input lead provided with the resistor, an electromagnetic brake for the equipment, said brake having a coil for releasing the brake connected to the output of said rectifying means.

5. In an electric system of control for controlling the brake used with equipment operated by an electric motor, in combination, a three-phase alternating-current motor coupled to the equipment to be driven by the motor, three input leads for the motor, a resistor in one input lead and controllable reactors in each of the other two leads, switching means for connecting said motor through the resistor and controllable reactors to a suitable source of three-phase alternating-current supply, rectifying means having input terminals connected across said resistors and having output terminals for supplying a direct-current output that is a function of the voltage drop across said resistor, an electromagnetic brake for the equipment, said brake having a coil for releasing the brake, and circuit means, including switching means, for connecting the coil to the output terminals of said rectifying means.

6. In an electric system of control for controlling the brake used with hoisting equipment, such as elevators, mine hoists, winches and cranes driven by an electric motor, in combination, a three-phase alternating-current induction motor coupled to its hoist load, three input leads for the motor, a controllable reactor in each of the two input leads, a resistor in the other of the input leads, switching means for connecting the motor through the reactors and resistor to a suitable three-phase supply of alternating-current, control means for said switching means to effect connection of the motor to the supply and for controlling the reactance value of the reactors to control the speed of said motor, rectifying means connected across said resistor to thus have a direct-current output as a function of the current flow in the input lead provided with the resistor, an electromagnetic brake for the motor load, said brake having a coil, for releasing the brake, connected to the output of said rectifying means.

7. In an electric system of control for controlling the brake used with hoisting equipment, such as elevators, mine hoists, winches and cranes, driven by an electric motor, in combination, a three-phase alternating-current induction motor coupled to its hoist load, three input leads for the motor, a controllable reactor in each of the two input leads, a resistor in the other of the input leads, switching means for connecting the motor through the reactors and resistor to a suitable three-phase supply of alternating current, control means for said switching means to effect connection of the motor to the supply and for controlling the reactance value of the reactors to control the speed of the motor, rectifying means having input terminals connected across said resistor and having output terminals for supplying a direct-current output that is a function of the voltage drop across said resistor, an electromagnetic brake for the hoisting equipment, said brake having a coil for releasing the brake, and circuit means, including further switching means also controlled by said control means, for connecting the coil to the output terminals of said rectifying means.

No references cited.